United States Patent Office 2,921,081
Patented Jan. 12, 1960

2,921,081

CATALYSIS

Wilford J. Zimmerschied, Crown Point, Ind., and Paul N. Rylander, Chicago, Ill., assignors to Standard Oil Company, Chicago, Ill., a corporation of Indiana No Drawing. Application March 15, 1956
Serial No. 571,589

20 Claims. (Cl. 260—329)

The present invention relates to a novel process for the preparation of complex acidic solid catalysts, the catalysts thereby produced, and to hydrocarbon conversions, particularly the conversion of olefins, in the presence of said catalysts. More specifically, this invention relates to catalysts derived from the reaction of certain compounds of zirconium with certain acids of phosphorus.

One subject of our invention is to provide novel self-supporting catalysts which are useful in hydrocarbon conversions, particularly the conversion of normally gaseous olefins. Another object is to provide an economical method for the preparation of acidic, complex, mechanically stable self-supporting zirconium-based catalysts. A further object is to prepare a zirconium-based catalyst of improved physical form. An additional object of our invention is to provide novel catalytic conversions employing the catalysts of the present invention. These and other objects of our invention will become apparent from the ensuing description thereof.

We have found that novel self-supporting catalysts useful for effecting conversion of olefinic hydrocarbons can be prepared by the reaction of a selected zirconium compound with a phosphoric acid selected from the group consisting of anhydrous orthophosphoric acid, pyrophosphoric acid and triphosphoric acid. Catalysts of our new class can satisfactorily be prepared from zirconium dioxide, for example, in the form of baddeleyite, and/or halides of zirconium, e.g., zirconium tetrachloride, zirconium tetrabromide and other zirconium chlorides and bromides, zirconium tetrafluoride, zirconium tetraiodide and the like.

We have found that non-stoichiometric, acidic, complex, solid catalysts containing zirconium, phosphorus, oxygen and hydrogen are obtained when zirconium dioxide (zirconia) is reacted with a phosphoric acid, of the group defined above, in proportions of between 0.2 and 3.0 gram atoms of zirconium per gram atom of phosphorus. The zirconium halides are preferably reacted in the range of about 0.2 to about 0.75 mols of zirconium halide per gram atom of phosphorus, corresponding to an atomic ratio of halogen to active hydrogen in the acid of phosphorus of between about 0.4 and 0.8. The reaction between zirconia and the phosphorus acid results in the liberation of water, whereas the reaction between the zirconium halide and the phosphorus acid leads to the evolution of hydrogen halide. Temperatures of about 220° C. to about 600° C. may be used although we usually employ about 220 to about 350° C. The reactants are suitably heated together at the desired reaction temperature for between about 2 to about 8 hours until evolution of volatile materials has substantially ceased, indicating completion of the reaction.

The particular experimental conditions suitable for the preparation of the catalysts of our invention vary somewhat, depending on the chemical reactivity and physical form of the reactants, e.g., whether the reactants are both liquid or consist of a solid reactant and a liquid reactant.

Where both reactants are liquid, for example, in the reaction of a phosphorus acid with zirconium tetrachloride, the reactants are commingled in a stirred vessel and gradually warmed to such a temperature that hydrogen chloride is evolved in a steady but controlled stream. The reaction starts at ordinary temperatures, and proceeds rapidly at 60° to 100° C. As HCl evolution slows down, the temperature is increased gradually to a maximum within the preferred range indicated above, optimally about 300° C. and is maintained until HCl evolution has exceeded about 3.5 mol per mol of zirconium tetrachloride and has practically ceased. It is important to subject the reaction mixture to a temperature above about 220° C. for a sufficient length of time to drive off HCl in a quantity approaching the theoretically derivable amount, the most active catalyst being obtained at about 96% or more of the theoretical HCl evolution.

When one of the reactants is a solid, for example, when zirconia is reacted with phosphoric acid, the reactants are mixed in the above mentioned proportions to produce a dough-like mass which can be readily shaped, as by extrusion, molding or pelleting. The shaped particles can then be heated to effect reaction between the zirconia and the acid of phosphorus, resulting in the production of a hard, mechanically stable, extremely reactive acidic catalyst. When less than about 0.2 mol of zirconia are employed per gram atom of phosphorus in the acid, sticky catalysts having undesirable mechanical properties are produced. When excessive ratios of zirconia to phosphorus are employed, catalyst activity is reduced. The preferred molar ratios are between about 0.5 and about 1.5 mols of zirconia per gram atom of phosphorus, suitably about 0.75 to 1.25 mols of zirconia per gram atom of phosphorus contained in the phosphoric acid of the selected class. If desired, $P_2O_5$ can be added to $H_3PO_4$ before reaction with zirconia.

X-ray analysis of the catalysts produced by the process of the present invention indicates that the catalysts produced by the interaction of zirconium tetrachloride with phosphorus acids are substantially identical with catalysts produced by the interaction of zirconium dioxide with the corresponding acid.

EXAMPLE 1

Mechanically stable and highly reactive catalysts were prepared by the reaction of zirconium tetrachloride with anhydrous orthophosphoric acid, prepared by dehydration of commercial 86% acid by evaporating the water under vacuum at temperatures below 100° C.

Into a three-neck, 500-milliliter flask, fitted with a dropping funnel, stirrer and reflux condenser were placed 98 gms. (1 mole) of anhydrous $H_3PO_4$ and the $ZrCl_4$ was added dropwise in amounts sufficient to conform to the chlorine to hydrogen ratios indicated in Table I. Soon after addition of $ZrCl_4$ had been started, the contents of the reaction flask became doughy, and HCl vapors evolved. The HCl was continuously swept out of the flask with a stream of nitrogen into a flask of ice-cold water, which was ultimately titrated. After all the $ZrCl_4$ had been added, the mixture was heated and HCl was liberated in a steady stream while the mixture gradually solidified. Heating was continued for about 4 hours till HCl evolution had substantially ceased, and the flask contents had reached a maximum temperature of about 300° C. The catalyst thus prepared (5 grams) was heated to 195° C. under autogenous pressure for 2 hours with 50–60 grams of propylene in a 250 cc. stainless steel reactor provided with a magnetically-actuated stirrer. The conversion, in weight percent, of propylene charged to form a liquid propylene polymer is indicated in Table I, runs 1–6.

EXAMPLE 2

A series of catalysts were prepared by the reaction of zirconium tetrachloride with anhydrous pyrophosphoric acid in accordance with the procedure of Example 1. The pyrophosphoric acid was prepared by addition of the theoretical amount of water to poly-phosphoric acid. The catalysts so formed were tested in the manner described to determine their activity in promoting the polymerization of propylene. The results of these tests are indicated in Table I, runs 7–9.

EXAMPLE 3

The procedure of Example 1 was repeated, utilizing as reactants zirconium tetrachloride and a mixture of phosphoric acids having the following composition:

| | Percent |
|---|---|
| Meta-phosphoric acid ($HPO_3$) | 3.6 |
| Triphosphoric acid ($H_5P_3O_{10}$) | 47.8 |
| Pyrophosphoric acid ($H_4P_2O_7$) | 28.6 |
| Ortho-phosphoric acid ($H_3PO_4$) | 20.0 |

The compositions so formed were tested in the manner described as catalysts for the polymerization of propylene. The results of these tests are indicated in Table I, runs 10–12.

Table I
REACTION OF $ZrCl_4$ WITH PHOSPHORUS ACIDS

| Run No. | Acid | Atomic Ratio Cl/H | Atomic Ratio Zr/P | Propylene Conversion, Wt. Percent |
|---|---|---|---|---|
| 1 | $H_3PO_4$ | .30 | .23 | (1) |
| 2 | $H_3PO_4$ | .40 | .3 | 66 |
| 3 | $H_3PO_4$ | .53 | .4 | 75 |
| 4 | $H_3PO_4$ | .67 | .5 | 19 |
| 5 | $H_3PO_4$ | .80 | .6 | 15 |
| 6 | $H_3PO_4$ | 1.00 | .75 | (2) |
| 7 | $H_4P_2O_7$ | .4 | .20 | 58 |
| 8 | $H_4P_2O_7$ | .52 | .26 | 93 |
| 9 | $H_4P_2O_7$ | .8 | .40 | 64 |
| 10 | $H_5P_3O_{10}$ | .48 | .223 | 48 |
| 11 | $H_5P_3O_{10}$ | .58 | .27 | 65 |
| 12 | $H_5P_3O_{10}$ | .73 | .34 | 56 |

[1] Catalyst was very sticky.
[2] Insufficient acid to obtain a good mixture.

It will be noted from Table I that the atomic Cl/H range of about 0.4 to about 0.8 is essential to obtain active polymerization catalysts.

EXAMPLE 4

Solid, highly reactive catalysts were prepared by reaction of zirconium dioxide with anhydrous orthophosphoric acid as follows: The reactants in proportions by weight indicated in Table II were mixed and heated to 350° C. in a glass flask for 4 hours. Before heating, the mixture was dough-like, but upon completion of heating, a very hard mass was produced which could be crushed to a powder before use or could be pelleted in conventional machinery with conventional pelleting aids. The catalysts thus prepared were tested for activity by the polymerization of propylene as described in Example 1. The conversions obtained with catalysts prepared from varying ratios of acid to $ZrO_2$ are indicated in Table II, runs 13–16.

EXAMPLE 5

Commercial polyphosphoric acid having the composition shown in Example 3 was mixed with $ZrO_2$ and heated to 350° C. in a glass flask for 4 hours. The catalyst thus prepared was tested for activity by the polymerization of propylene. The conversion of propylene to liquid polymer is shown in Table II, runs 17–19.

Table II
REACTION OF $ZrO_2$ WITH PHOSPHORUS ACIDS

| Run No. | Acid | Wt. Ratio, Acid/$ZrO_2$ | Atomic Ratio, Zr/P | Propylene Conversion, Wt. Percent |
|---|---|---|---|---|
| 13 | $H_3PO_4$ | .5 | 1.6 | 25 |
| 14 | $H_3PO_4$ | 1 | .8 | 36 |
| 15 | $H_3PO_4$ | 2 | .4 | 43 |
| 16 | $H_3PO_4$ | 4 | .2 | 42 |
| 17 | $H_5P_3O_{10}$ | 1 | .72 | 80 |
| 18 | $H_5P_3O_{10}$ | 2 | .36 | 83 |
| 19 | $H_5P_3O_{10}$ | 4 | .18 | 54 |

EXAMPLE 6

Equal proportions by weight of $ZrO_2$ and anhydrous orthophosphoric acid were reacted together by heating to 350° C. in a glass flask for 4 hours. The catalyst so formed converted 36 weight percent of the propylene charged to produce liquid polymers in a stirred autoclave at 200° C. and 10% catalyst concentration.

EXAMPLE 7

The use of aqueous orthophosphoric acid resulted in the production of a solid product but it was catalytically inactive as shown by the following data. Equal weights of 85% aqueous $H_3PO_4$ and $ZrO_2$ were mixed and heated to 380° C. for 4 hours to yield a hard, solid material. A stirred autoclave of 250 ml. capacity was charged with 5 g. of the solid material and 39 g. of propylene and was then heated for 2 hours at 200° C. Only 2.6 weight percent of the propylene charged was converted to polymer.

EXAMPLE 8

The activity of the catalysts of our invention in promoting the alkylation of thiophene is illustrated by this example.

Into a 250 cc. stainless steel reactor provided with a magnetically-actuated stirrer were introduced 1.2 mols of thiophene, 20 grams of propylene (0.48 mol) and 5 grams of the catalyst prepared in the run indicated. The mixture was heated to 227° C. for 4 hours. The reaction gave a substantial yield of propylthiophene ($n_D^{20}$ 1.5039) and smaller amounts of higher boiling materials (polypropylthiophenes) as indicated in the following table.

| Catalyst | Yield Propylthiophene, grams | Yield Polypropylthiophenes, grams | Conversion,[1] percent |
|---|---|---|---|
| From Run 3 | 17 | 3 | 28 |
| From Run 17 | 18.8 | 3.3 | 31 |

[1] Based on propylene charged to the reactor.

EXAMPLE 9

The alkylation of aromatic hydrocarbons in the presence of our new catalysts is illustrated hereinafter.

A 250 cc. reactor of the type described above was charged with 92.1 grams of toluene (1 mol), 21 grams of propylene (0.5 mol) and 5 grams of the catalyst prepared in the run indicated in the table. The reaction mixture was heated with stirring at 195° C. for 2.5 hours. The reaction mixture was separated from the catalyst and fractionally distilled to yield a mixture of cymenes having the boiling range of 173°–175° C., $n_D^{20}$ 1.4938. The conversion to cymenes, based on propylene charged, is indicated.

| Catalyst | Yield, g. | Conversion,[1] percent |
|---|---|---|
| Run 3 | 38 | 57 |
| Run 17 | 43 | 64 |

[1] Wt. percent based on propylene charged to the reactor.

EXAMPLE 10

Catalysts of the present invention were employed in flow polymerization studies. A batch of catalyst was prepared by heating equal weights of zirconia and commercial polyphosphoric acid (of the composition detailed above) at 350° C. for 4 hours. The resultant solid was crushed and screened to 12–14 mesh per inch. A vertical flow reactor was charged with about 60 cc. of catalyst weighing 74.9 grams. An olefinic charging stock was passed downwardly through a fixed catalyst bed throughout the duration of a run. In the first flow run a charging stock consisting of 50 weight percent propane and 50 weight percent propylene was passed through the catalyst at 200° C., 300 p.s.i. and liquid hourly space velocity of one. The activity of the catalyst increased as the operation proceeded, is shown by the following tabulation, wherein catalyst age is expressed in the left-hand column.

| Lb. polymer/lb. catalyst | Conversion of Propylene to Liquid Polymer Wt. Percent of Propylene Charged |
|---|---|
| 0.42 | 49 |
| 1.11 | 53.5 |
| 1.90 | 60.6 |

When the liquid hourly space velocity of the charging stock was then increased to 1.5, propylene conversion was 55%. The polymer product was collected and subjected to standard ASTM distillation with the following results:

Vol. percent:                            B.P., ° F.
- Initial _____ 158
- 10 _____ 243
- 20 _____ 271
- 30 _____ 291
- 40 _____ 305
- 50 _____ 321
- 60 _____ 341
- 70 _____ 360
- 80 _____ 383
- 90 _____ 460
- Maximum _____ 493

The propylene polymer had a clear octane number of 89.3, CFR-R method.

The same reactor and catalyst were employed for continuous polymerization of refinery butylenes containing 33.9% olefins. At a temperature of 165° C., liquid hourly space velocity of 3 and 600 p.s.i., olefin conversion to polymer was 72% per cycle. During the run 570 g. of feed were passed through 74.9 g. of catalyst. The octane number of the polymer product was 97.3, clear, CFR-R method.

The catalysts of our invention may be employed to effect the conversion of normally gaseous olefins to liquids of higher molecular weight under conventional conditions for polymerization. For example, polymerization may be effected in a batch or continuous operation, as illustrated above, at temperatures of between about 100° and 500° C., preferably from between about 150° and 300° C. and at pressures of between 100 and 1000 p.s.i. Under continuous polymerization conditions, suitable liquid hourly space velocities are usually selected between about 0.1 and about 10, depending upon the activity of the catalyst and the conversion per pass desired.

EXAMPLE 11

Hydrodesulfurization activity of our catalysts proved attractive as will be noted from the following data. The catalyst was prepared as before by heating equal weights of zirconia and commercial polyphosphoric acid to about 350° C. and the resultant solid was pelleted. The vapors of a West Texas virgin naphtha (0.319 w. percent sulfur; boiling range 100–380° F.) were passed over a fixed bed of the catalyst pellets at 400° C., 1000 p.s.i. of hydrogen, at a vapor space velocity corresponding to a liquid hourly space velocity of 2. In a run of 2 hours duration, the average percent desulfurization of the naphtha was 66.4%. The sulfur was eliminated as $H_2S$. When 1.5% of cobalt carbonate was added to the catalyst during preparation, the catalyst was even more effective for desulfurization. Under the same conditions as above, 70.5% desulfurization was achieved.

The above specific Examples of the preparation of our novel catalysts and their employment are intended to be illustrative and not unduly limitative of the broad scope of our invention.

For the puroposes of various hydrocarbon conversions, our new catalysts may be promoted, if desired, by addition to the conversion zone of a small proportion (for example, 0.5 to 5 percent by weight of the catalyst) of a hydrogen halide such as hydrogen chloride, hydrogen bromide or material affording hydrogen halide (for example, alkyl halides).

Although certain specific uses of our catalysts have been described above, these are merely illustrative. In general, the novel catalysts of this invention may be employed to facilitate various conversions, particularly of hydrocarbons, which have heretofore been catalyzed by other acidic catalysts (proton or Lewis acids) such as sulfuric acid, hydrofluoric acid, liquid or "dry" phosphoric acids, $AlCl_3$, acidic silica-alumina catalysts, active clays, and the like. Thus they may be employed for the cracking of heavy naphthas or gas oils at high temperatures, decolorization of petroleum fractions, removal of diolefinic components from cracked gasolines, polymerization of normally gaseous olefins, alkylation of aromatic hydrocarbons or heterocyclic compounds such as thiophene, furan and the like, isomerization of methyl-substituted paraffins such as 2-methylpentane, isomerization of xylenes and also for dehydrogenation reactions, for example, dehydrogenation of cumene to produce alpha-methylstyrene.

The catalysts produced by the present invention may also be employed for the interaction of olefins with hydrogen sulfide to produce mercaptans; the interaction of olefins, carbon monoxide and steam to produce carboxylic acids; the polymerization of olefin oxides; the interaction of alcohols, phenols or mercaptans with olefin oxides to produce polyalkoxy derivatives thereof; the dehydration of alcohols to produce olefins; the dehydration of 1,3-butylene glycol to produce butadiene; the reactions of olefins with carboxylic acids to form esters, etc.

When it becomes necessary to regenerate the present catalysts by reason of the accumulation thereon of hydrogen-deficient carbonaceous materials or other catalysis-inhibiting materials, this may be accomplished by contacting the catalyst with oxygen-containing gases such as air or flue gases containing 1 to 10 volume percent oxygen at temperatures between about 400° C. and about 500° C. and atmospheric pressure for about ½ to about 10 hours. Alternatively, partially spent catalysts may be treated with hydrogen at temperatures between about 350° C. and about 500° C. under a hydrogen pressure of at least about 500 p.s.i., for example, 500 to 2000 p.s.i., for about ½ to 24 hours. If desired, the oxidation and reduction treatments may be performed in succession. Also, as a preliminary to the above-mentioned regeneration treatments, it may be desirable to extract the catalyst with a hydrocarbon solvent such as benzene, pentane, hexane, or the like, at temperatures between about 50 and about 200° C. under pressure sufficient to maintain the extractant in the liquid phase, in order to remove extractable hydrocarbon residues from the catalyst.

This application is a continuation-in-part of our copending application Serial No. 379,301, filed September 9, 1953, now abandoned.

Having thus described our invention, we claim:

1. A process for the production of a solid catalyst requiring no added solid supporting material, suitable for catalyzing conversions of olefinic hydrocarbons, which process consists essentially of mixing a zirconium compound selected from the class consisting of the halides of zirconium and zirconium dioxide with an acid of phosphorus selected from the class consisting of substantially anhydrous orthophosphoric acid, pyrophosphoric acid and triphosphoric acid, said halides being used in proportions equivalent to about 0.4 to about 0.8 gram atom of halogen per gram atom of hydrogen in said acid, and said dioxide being used in proportions equivalent to about 0.2 to about 3.0 mols per gram atom of phosphorus contained in said acid and heating said mixture at a reaction temperature between about 220° C. and about 600° C. to obtain a dry, solid catalyst.

2. A process for the production of a solid catalyst requiring no added solid supporting material, suitable for catalyzing conversions of olefinic hydrocarbons, which process consists essentially of mixing zirconium dioxide with substantially anhydrous orthophosphoric acid in proportions equivalent to about 0.2 to about 3.0 mols of zirconium dioxide per gram atom of phosphorus contained in said acid, and heating said mixture at a reaction temperature between about 220° C. and about 600° C. to obtain a dry, solid catalyst.

3. The process of claim 2 wherein between about 0.5 and about 1.5 mols of zirconium dioxide are employed per gram atom of phosphorus contained in said acid and said reaction temperature is between about 220° C. and about 350° C.

4. A process for the production of a solid catalyst requiring no added solid supporting material, suitable for catalyzing conversions of olefinic hydrocarbons, which process consists essentially of mixing zirconium dioxide with substantially anhydrous pyrophosphoric acid in proportions equivalent to about 0.2 to about 3.0 mols of zirconium dioxide per gram atom of phosphorus contained in said acid, and heating said mixture at a reaction temperature between about 220° C. and about 600° C. to obtain a dry, solid catalyst.

5. The process of claim 4 wherein between about 0.5 and about 1.5 mols of zirconium dioxide are employed per gram atom of phosphorus contained in said acid and said reaction temperature is between about 220° C. and about 350° C.

6. A process for the production of a solid catalyst requiring no added solid supporting material, suitable for catalyzing conversions of olefinic hydrocarbons, which process consists essentially of mixing zirconium dioxide with a mixture of substantially anhydrous phosphoric acids including a substantial proportion of triphosphoric acid in proportions between about 0.2 and about 3.0 mols of zirconium dioxide per gram atom of phosphorus contained in said mixture, and heating said mixture at a reaction temperature between about 220° C. and about 600° C. to obtain a dry, solid catalyst.

7. The process of claim 6 wherein between about 0.5 and about 1.5 mols of zirconium dioxide are employed per gram atom of phosphorus contained in said acid and said reaction temperature is between about 220° C. and about 350° C.

8. The process for the production of a solid catalyst requiring no added solid supporting material, suitable for catalyzing conversions of olefinic hydrocarbons, which process consists essentially of mixing a zirconium halide with an acid of phosphorus selected from the class consisting of substantially anhydrous orthophosphoric acid, pyrophosphoric acid and triphosphoric acid, said halide being used in a proportion equivalent to about 0.4 to about 0.8 gram atom of halogen per gram atom of hydrogen in said acid, and heating said mixture at a reaction temperature between about 220° C. and about 600° C. to obtain a dry, solid catalyst.

9. A process for the production of a solid catalyst requiring no added solid supporting material, suitable for catalyzing conversions of olefinic hydrocarbons, which process consists essentially of mixing zirconium tetrachloride and substantially anhydrous orthophosphoric acid in proportions equivalent to about 0.4 to about 0.8 gram atom of chlorine per gram atom of hydrogen in said acid, and heating said mixture at a reaction temperature between about 220° C. and about 600° C. to obtain a dry, solid catalyst.

10. A process for the production of a solid catalyst requiring no added solid supporting material, suitable for catalyzing conversions of olefinic hydrocarbons, which process consists essentially of mixing zirconium tetrachloride and substantially anhydrous pyrophosphoric acid in proportions equivalent to about 0.4 to about 0.8 gram atom of chlorine per gram atom of hydrogen in said acid, and heating said mixture at a reaction temperature between about 220° C. and about 600° C. to obtain a dry, solid catalyst.

11. A process for the production of a solid catalyst requiring no added solid supporting material, suitable for catalyzing conversions of olefinic hydrocarbons, which process consists essentially of mixing zirconium tetrachloride with a mixture of substantially anhydrous phosphoric acids including a substantial proportion of triphosphoric acid in proportions equivalent to about 0.4 to about 0.8 gram atom of chlorine per gram atom of hydrogen in said mixture of acids, and heating said mixture at a reaction temperature between about 220° C. and about 600° C. to obtain a dry, solid catalyst.

12. A catalyst produced by the process of claim 1.

13. A process for the conversion of an olefin, which process comprises contacting said olefin under conversion conditions with the catalyst produced by the process of claim 1.

14. A process for the polymerization of a normally gaseous olefin, which process comprises contacting said olefin under polymerization reaction conditions including a temperature between about 150° C. and about 300° C. under autogenous pressure with a catalyst produced by the process of claim 1.

15. The process of claim 14 wherein said olefin is propylene.

16. The process of claim 14 wherein said olefin is a butylene.

17. A process for the alkylation of a normally gaseous olefin, which process comprises contacting said olefin and an olefin-alkylatable compound with a catalyst produced by the process of claim 1 under alkylating conditions.

18. The process of claim 17 wherein said olefin-alkylatable compound is an aromatic hydrocarbon.

19. The process of claim 17 wherein said olefin-alkylatable compound is thiophene.

20. A process for the polymerization of propylene, which process comprises contacting propylene under polymerization reaction conditions including a temperature between about 150° C. and about 300° C. under autogenous pressure with a catalyst produced by the process which consists essentially of mixing zirconium tetrachloride and substantially anhydrous orthophosphoric acid in proportions sufficient to furnish between about 0.4 and about 0.8 gram atom of chlorine per gram atom of hydrogen in said acid, and heating mixture at a reaction temperature between about 220° C. and about 600° C. to obtain a dry, solid catalyst.

References Cited in the file of this patent

UNITED STATES PATENTS

| | | |
|---|---|---|
| 2,230,648 | Layng | Feb. 4, 1941 |
| 2,349,243 | Bates | May 23, 1944 |
| 2,639,286 | Mavity | May 19, 1953 |
| 2,650,201 | Mavity | Aug. 25, 1953 |
| 2,656,323 | Bielawski et al. | Oct. 20, 1953 |
| 2,727,010 | Zimmerschied | Dec. 13, 1955 |
| 2,772,244 | Shalit et al. | Nov. 27, 1956 |